United States Patent
Young

[19]

[11] Patent Number: 5,863,166
[45] Date of Patent: Jan. 26, 1999

[54] ANTI-THEFT LOCKING DEVICE

[75] Inventor: Linda Ellen Young, Edmonton, Canada

[73] Assignee: Pinhead Components Inc., Edmonton, Canada

[21] Appl. No.: 906,795

[22] Filed: Aug. 5, 1997

[30] Foreign Application Priority Data

Aug. 5, 1996 [GB] United Kingdom .................... 9616421

[51] Int. Cl.[6] .............................. F16B 23/00; F16B 35/06
[52] U.S. Cl. .......................... 411/405; 411/169; 411/910; 411/973; 301/5.1
[58] Field of Search .................................... 411/403, 405, 411/169, 910, 919, 973; 70/225, 229, 230, 233; 301/5.1

[56] References Cited

U.S. PATENT DOCUMENTS

| 1,447,564 | 3/1923 | Norlund et al. .................... 411/910 X |
| 2,218,126 | 10/1940 | Thacher . |
| 2,534,446 | 12/1950 | Howard . |
| 3,034,386 | 5/1962 | Corlett et al. ........................ 411/910 X |
| 3,519,979 | 7/1970 | Bodenstein . |
| 4,018,111 | 4/1977 | Goldhaber ........................... 411/403 X |
| 4,025,140 | 5/1977 | Matys .................................. 411/405 X |
| 4,057,985 | 11/1977 | Stahl . |
| 4,114,409 | 9/1978 | Scire . |
| 4,621,873 | 11/1986 | Weinstein et al. . |
| 4,674,306 | 6/1987 | Halpern . |
| 5,007,260 | 4/1991 | Sharp . |
| 5,112,176 | 5/1992 | McCauley et al. . |

FOREIGN PATENT DOCUMENTS

| 2504617 | 10/1982 | France .................................... 411/169 |
| 2095356 | 9/1982 | United Kingdom . |

*Primary Examiner*—Neill Wilson
*Attorney, Agent, or Firm*—Rudnick & Wolfe; Michael L. Kenaga

[57] ABSTRACT

A device for locking bicycle components to the bicycle frame comprises a threaded bolt with a corresponding nut having a rotatable casing surrounding the outer surface thereof and a key for engaging the nut. The key and the end face of the nut have at least one spigot and at least one hole such that the spigots of each fit into the holes of the other. When so engaged, the key is capable of turning the nut. The key preferably includes leverage arms for aiding the turning of the nut.

17 Claims, 4 Drawing Sheets

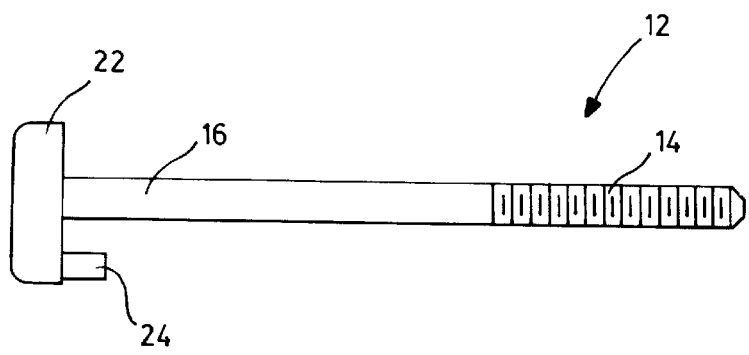 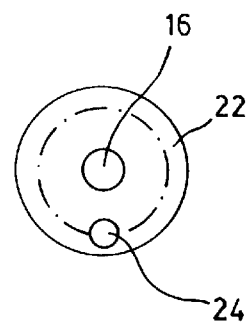
FIG. 5    FIG. 6
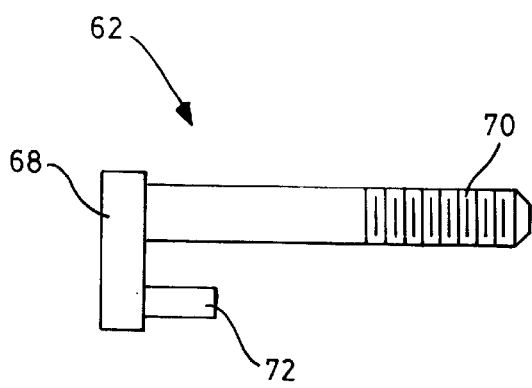 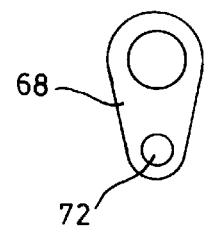
FIG. 7    FIG. 8

5,863,166

ANTI-THEFT LOCKING DEVICE

FIELD OF THE INVENTION

This invention relates to anti-theft devices for securing articles and in particular to a locking nut and bolt device for preventing the theft of bicycle components.

BACKGROUND OF THE INVENTION

The most common mechanisms used to secure wheels and seats on bicycle forks and frames are of the quick release type or the simple hexagonal nut. The quick release device incorporates a lever that need only be slightly moved in order to release the wheel or seat. In both the quick release of hexagonal nut devices, the wheels, seat and/or handlebars of a bicycle are easily removed. Thus, the bicycle owner must lock both wheels to the bicycle using either a Kryptonite (U-shaped) lock, long chains etc., or must remove one of the wheels and lock it to the other or take it away. Any of these options is inconvenient and not very reliable. Various locking devices have been proposed in U.S. Pat. Nos. 3,519,979 and 5,112,176 and UK patent application 2,095,356. Although the nuts described in these references offer an improvement over the prior mechanisms and pose an impediment to removal using wrenches, they are prone to removal by means of common tools.

For example, the device taught in UK application 2,095,356 comprises a nut with a smooth outer surface surrounded by a rotatable casing. The face of the nut includes a plurality of holes which correspond with a plurality of spigots on a key. In such manner the key engages the nut face and is used to rotate same. Although the rotatable casing prevents removal of the nut by means of pliers etc. the nut still may be turned by inserting a variety of tools (for example needle nose pliers) into the holes and forcing the nut to rotate. Further, the key taught in this reference has an hexagonal outer surface therefore necessitating the use of a wrench in turning the nut.

Another deficiency in the quick release types of locks are that they are prone to inadvertent release thereby posing a safety hazard for the cyclist.

There is therefore a need for a simple, lightweight device that locks various components of a bicycle to the bicycle frame.

SUMMARY OF THE INVENTION

It is therefore an object of the present invention to provide a locking nut and bolt assembly that overcomes the problems in the prior art. More specifically, the invention provides, in one aspect, an anti-theft device for a threaded bolt comprising:

a) a nut, for engaging the bolt, having a generally cylindrical main body with a threaded bore, an outer surface, and a generally annular end face, the end face having at least one spigot and at least one hole, each extending parallel to a longitudinal axis of the nut;

b) a casing coaxial with the nut and surrounding the outer surface of the nut, the casing being rotatable about the main body of the nut;

c) a key having a face including at least one spigot and at least one hole;

wherein, the spigots and holes on the nut end face are complementary to the spigots and holes on the key face whereby the key is capable of engaging the end face of the nut to rotate the nut on the threaded bolt.

In another aspect, the invention provides for an anti-theft device for securing bicycle components to a bicycle frame, the device comprising:

a) a threaded bolt for insertion through an opening, the bolt including an end plate at one end thereof to prevent passage completely through the opening;

b) a nut, for engaging the bolt, having a generally cylindrical main body with a threaded bore, an outer surface, and a generally annular end face, the end face having at least one spigot and at least one hole, each extending parallel to a longitudinal axis of the nut;

c) a casing coaxial with the nut and surrounding the outer surface of the nut, the casing being rotatable about the main body of the nut;

d) a key having a face including at least one spigot and at least one hole;

wherein, the spigots and holes on the nut end face are complementary to the spigots and holes on the key face whereby the key is capable of engaging the end face of the nut to rotate the nut on the threaded bolt.

In yet another aspect the invention provides an anti-theft device comprising a lock and a key adapted to be received by the lock, the lock having a face with at least one spigot and at least one hole and the key having at least one spigot and at least one hole complementary to those of the lock, whereby the key unlocks the lock.

In a further aspect the invention provides an anti-theft device comprising a bolt, the bolt comprising a shaft having a threaded end and an opposite end having a generally circular head, the head having a face opposite to the shaft, the face having at least one spigot and at least one hole, and a key adapted to be received by the face, the key having at least one spigot and at least one hole complementary to those on the face, whereby the key rotates the bolt.

BRIEF DESCRIPTION OF THE DRAWINGS

These and other features of the preferred embodiments of the invention will become more apparent in the following detailed description in which reference is made to the appended drawings wherein:

FIG. 5 is a side view of a bolt of the invention for a bicycle wheel.

FIG. 6 is a front-end view of the bolt of FIG. 5.

FIG. 7 is a side view of the bolt of the invention for a bicycle seat.

FIG. 8 is a front-end view of the bolt of FIG. 7.

DETAILED DESCRIPTION OF THE PREFERRED EMBODIMENT

Figure 1:
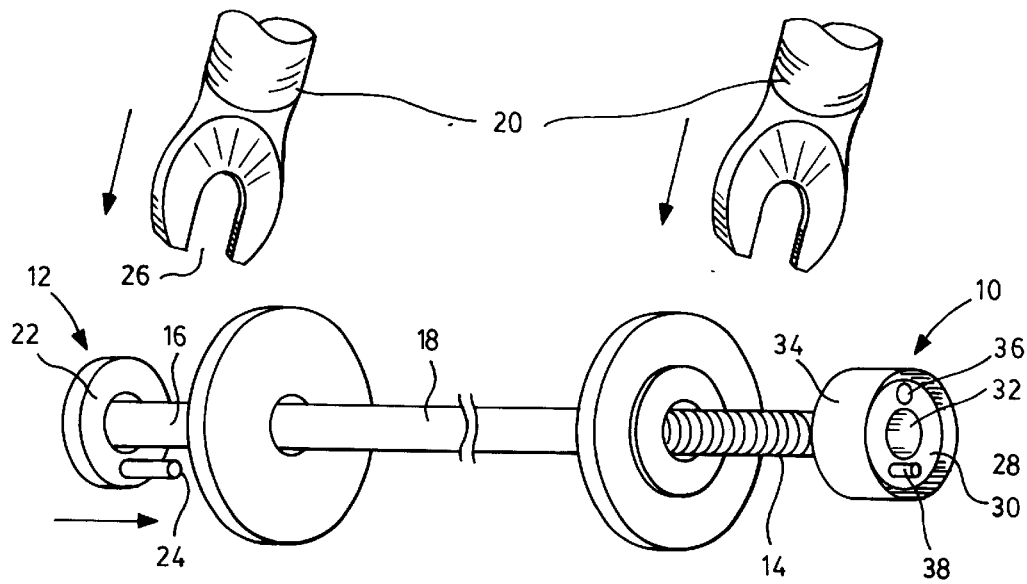
FIG. 1 is a perspective view of a locking device for bicycle wheel application according to one embodiment of the invention.

Referring to FIG. 1, the locking device includes a nut 10 is removably attached to a bolt 12 having a threaded end 14 and an opposite end 16. The bolt is inserted through a bicycle wheel axle 18 and the forks 20 of a bicycle frame are lowered to rest on the bolt 12 on opposite outer sides of the axle 18. An end piece 22 on the end 16 of bolt 12 prevents the bolt from passing through the axle 18. The end piece 22 comprises a plate having a leg 24. Further views of the bolt are provided in FIGS. 5 and 6.

The locking nut 10 includes a generally annular nut 28 having an outer surface 30 facing away from the wheel and an internally threaded bore 32 extending there through. The threads of the bore 32 cooperate with the threads on the threaded end 14 of bolt 12. The outer surface 30 of the nut 28 includes one pocket or recessed portion 36 and one shaft or protruding portion 38 that extend inward and outward, respectively, from the outer surface 30 of the nut. The recessed and protruding portions 36 and 38 are offset from the axis of the nut. Concentrically surrounding the nut 28 is a casing 34 which is freely rotatable around the nut and which, when the nut is tightened, preferably extends axially over the nut, beyond the raised portion 38.

Figure 2:
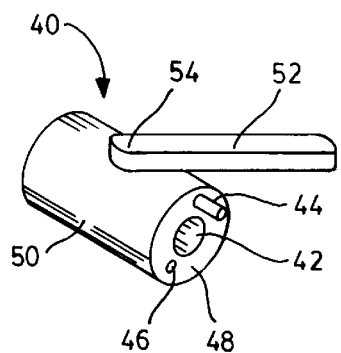
FIG. 2 is a perspective view of a key for use with the nut of the locking device.
Figure 2A:
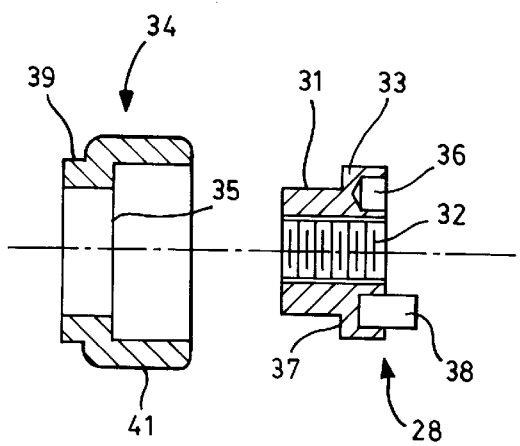
FIG. 2A is an exploded cross sectional view of the nut and casing combination.

FIG. 2A illustrates the nut and casing combination in more detail. As shown in FIG. 2A, the nut 28 has a rear portion 31 that is of a lesser diameter than the front portion 33. The casing 34 comprises an annular ring having a rear portion 39 having a lesser inner and outer diameter than that of front portion 41. In such manner, a shoulder 35 is provided within the central bore of the casing 34 which, upon insertion of the nut 28 within the casing, impinges on the rear face 37 of front portion 33 of the nut 28. This arrangement prevents removal of the casing when the nut is engaged on the bolt.

FIG. 2 illustrates a key 40 for securing or detaching the locking nut 28. The key comprises a generally cylindrical main body 50 having a central bore 42. The key 40 has a first end 48, which includes one shaft or protruding portion 44 and one pocket or recessed portion 46 extending outward and inward, respectively. The sizes and positions of the protruding and recessed portions, 44 and 46, of the key 40 correspond to the sizes and locations of the recessed and protruding portions, 36 and 38, of the nut 28. The protruding portions, 44 and 38 of the key and the nut are dimensioned complementary to the recessed portions 36 and 46, respectively so that the protruding portions fit snugly within the recessed portions. The diameter of the key is less than the internal diameter of the front portion 41 of the casing 34. Preferably, the diameter of the key 40 is the same as that of the front portion 33 of the nut 28. In such manner, the key 40 is able to engage the nut 28 within the casing and allow same to turn the nut. The bore 42 is dimensioned to accommodate the diameter of the threaded end 14 of the bolt 12.

In the preferred embodiment, the casing 34 extends beyond the nut 28 over the surface 30 at least a sufficient distance to allow the alignment of protruding portions 44 and 38 with the corresponding recessed portions 36 and 46 and to allow the key 40 to rotate the nut 28.

In one embodiment, the key 40 has a handle 52 attached to the key at a pivot point 54. The handle is rotatably attached to the key thereby allowing the handle to swivel about a plane parallel to the central axis of the key. The handle is designed to provide sufficient leverage to allow the key 40 to rotate the nut 28.

Figure 9:
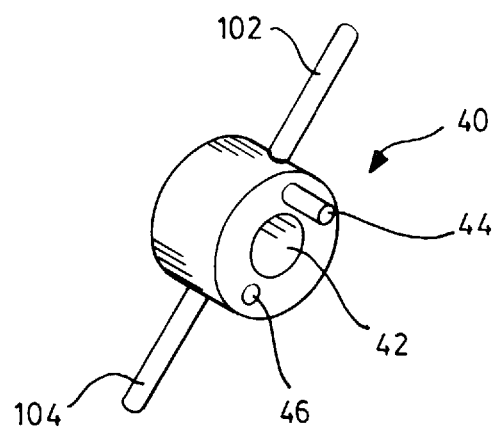
FIG. 9 is a perspective view of a key of the present invention in accordance with a preferred embodiment.

A preferred embodiment of the key is shown in FIG. 9. In this embodiment, the swivel handle 52 is replaced by a pair of lever arms, 102 and 104, which are secured to the body of the key 40. The lever arms provide the necessary leverage to allow the key to tighten or remove the nut 28.

The locking nut and bolt operate as follows. The threaded portion of the bolt 12 is inserted through the axle 18. The frame of the bicycle is positioned over the bolt 12 and the bolt is rotated so as to allow the leg 24 of the bolt to be positioned within the opening 26 on the fork 20 thereby preventing rotation of said bolt. The threaded portion 14 of the bolt 12 is inserted through the central bore of the casing 34 which, in turn, is followed by the nut 28. With both the casing and the nut, the rear portions are inserted onto the bolt first. The first end 48 of the key 40 is coupled to the outer surface 30 of the nut 28 by engaging protruding portions 44 and 38 with recessed portions 36 and 46. The key is then used to rotate the nut in the casing thereby tightening the nut on the bolt until the bicycle frame is secured to the bicycle wheel axle. The key is then removed off the nut 28. When the wheel is to be removed, the key 40 is again engaged to the front face 30 of the nut 28 and the nut is loosened and removed. When the nut 28 is secured, it cannot be easily rotated within the casing 34 as no gripping surface is exposed. In this manner, removal of the nut is possible only with a key having a configuration complementary to the nut.

In another embodiment, the relative positions of the recessed portion 36 and protruding portion 38 of the nut can be varied, with a corresponding variation in the protruding and recessed portions 44 and 46 of the key, thereby allowing an infinite variety of locking nut/key combinations. Alternatively, a plurality of protruding and recessed portions, of varying sizes and positions, may be included on the nut and key to achieve the same result.

The key and nut may be made of high-grade steel, titanium or machined aluminum. The casing can be made of high grade steel, titanium, aluminum or hard plastic and in any of various ways as would be known to a person skilled in the art for the desired strength and lightness. For better quality and improved security, the key and nut are preferably made of high-grade steel and the casing is preferably made of aluminum.

Figure 3:
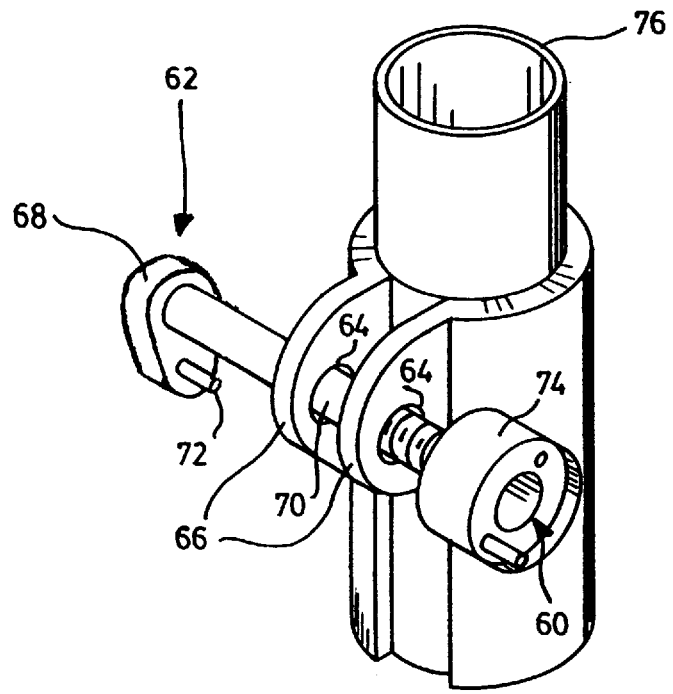
FIG. 3 is a perspective view of a locking device for bicycle seat application according to another embodiment of the invention.

In another embodiment, the locking nut and bolt assembly is adapted for use in fastening a bicycle seat to the bicycle frame. As shown in FIG. 3, the nut 60 engages a bolt 62 inserted through openings 64 in extensions 66 in the bicycle frame. The bolt has a threaded portion 70 which is inserted through the openings 64 and an end piece 68 which prevents the bolt from completely passing through the openings 64. The end piece comprises a plate having a leg 72 extending in the same direction as the threaded portion 70 and spaced apart therefrom so as to engage a corner formed by the extensions 66 and the bicycle frame and thereby prevent axial rotation of the bolt 62.

The nut 60 is of the same structure as discussed above and has an associated casing 74. The structure and arrangement of the nut and casing is similar to that shown in FIG. 2A with dimensions adjusted for use for the seat. FIGS. 7 and 8 illustrate the bolt of this embodiment in more detail.

As before, the nut is secured onto the bolt by means of a key as shown in FIG. 9. As the nut is tightened, the frame of the bicycle is forced to tighten around the seat post 76 until the post is secured in the desired position.

Figure 4:
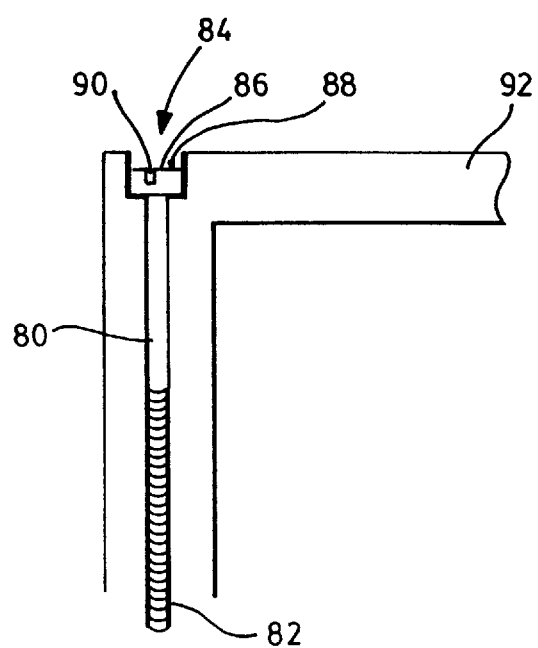
FIG. 4 is a cross sectional view of a locking device for bicycle handle bar application according to another embodiment of the invention.

FIG. 4 illustrates a further embodiment of the invention for securing handle bars 92 to the frame of a bicycle wherein the locking nut forms part of the bolt. In this embodiment, the usual fastener, namely a hexagonal bolt, is replaced with a bolt 80 of the present invention having a threaded end 82 and a head 84. The threaded portion is adapted to engage a bicycle frame in the usual manner. The head of the bolt comprises a top face 86 having a protruding portion 88 and a recessed portion 90. A key such as that shown in FIG. 9 is adapted to engage the top face 86 for tightening or loosening same in the same manner as discussed above. The bolt is dimensioned so as to be recessed in the handle bar whereby unscrewing of the bolt is not possible without the corresponding key.

As with the embodiment of the nut for wheels, removal of either the seat or handlebars, when fasteners of the present invention are used, is possible only with a key having a configuration complementary to the nut.

In a further embodiment the configuration of the locking nut can be used on bicycle locks and locks for bicycle racks, for use on cars or trucks, or other such apparatus. For example, in such racks, it is common for the front wheel of a bicycle to be removed and the forks of the bicycle frame attached to the rack. The use of the present invention would securely lock the bicycle frame to the rack. Similarly, standard locks such as the above mentioned U-shaped lock can be designed to replace the standard key receiving portion to that having the configuration of the locking nut. In such manner one key can be used for all applications relating to the security of the bicycle.

Once the locking devices of the present invention are in place, the wheels, seat and handlebar of the bicycle are securely locked to the frame. Accordingly, it is not necessary to detach either of the components or to extend the usual chain or U-shape lock to secure same. This therefore leads to increased security and convenience for the user. Also, the locks of the invention can be chosen such that the same key can be used on the wheels, seat and/or handlebars.

In another embodiment, the casing may be rotatably attached to the nut.

In yet another embodiment, the spigots and holes of both the key and nut (or lock) can be of any configuration and of any shape.

Although the invention has been described with reference to certain specific embodiments, various modifications thereof will be apparent to those skilled in the art without departing from the spirit and scope of the invention as outlined in the appended claims.

The embodiments of the invention in which an exclusive property or privilege is claimed are defined as follows:

1. An anti-theft device for a threaded bolt comprising:
    a) a nut, for engaging said bolt, having a generally cylindrical main body with a threaded bore, an outer surface, and a generally annular end face, said end face having at least one spigot and at least one hole, each extending parallel to a longitudinal axis of said nut;
    b) a casing coaxial with said nut and surrounding said outer surface of said nut, said casing being rotatable about the main body of said nut;
    c) a key having a face including at least one spigot and at least one hole;
    wherein, said spigots and holes on said nut end face are complementary to said spigots and holes on said key face whereby said key is capable of engaging the end face of said nut to rotate said nut on said threaded bolt.

2. A device as claimed in claim 1 wherein said nut outer surface is smooth.

3. A device as claimed in claim 2 wherein said casing extends beyond said spigots on the end face of the nut.

4. A device as claimed in claim 3 wherein each of said nut and key include one of said spigot and said hole.

5. A device as claimed in claim 4 wherein said key includes at least one leverage arm to facilitate rotation of said key when engaged on said nut.

6. A device as claimed in claim 5 wherein said key includes two diametrically opposed leverage arms.

7. A device as claimed in claim 6 for use in locking bicycle components to a bicycle frame.

8. An anti-theft device for securing bicycle components to a bicycle frame, said device comprising:
    a) a threaded bolt for insertion through an opening, said bolt including an end plate at one end thereof to prevent passage completely through said opening;
    b) a nut, for engaging said bolt, having a generally cylindrical main body with a threaded bore, an outer surface, and a generally annular end face, said end face having at least one spigot and at least one hole, each extending parallel to a longitudinal axis of said nut;
    c) a casing coaxial with said nut and surrounding said outer surface of said nut, said casing being rotatable about the main body of said nut;
    d) a key having a face including at least one spigot and at least one hole;
    wherein, said spigots and holes on said nut end face are complementary to said spigots and holes on said key face whereby said key is capable of engaging the end face of said nut to rotate said nut on said threaded bolt.

9. A device as claimed in claim 8 wherein said nut outer surface is smooth.

10. A device as claimed in claim 9 wherein said casing extends beyond said spigots on the end face of the nut.

11. A device as claimed in claim 10 wherein each of said nut and key include one of said spigot and said hole.

12. A device as claimed in claim 11 wherein said key includes at least one leverage arm to facilitate rotation of said key when engaged on said nut.

13. A device as claimed in claim 12 wherein said key includes two diametrically opposed leverage arms.

14. A device as claimed in claim 13 wherein said component is a bicycle wheel axle and said bolt passes there through.

15. A device as claimed in claim 14 wherein said end plate of said bolt further includes a leg extending in the same direction as said threaded portion, said leg being adapted to engage said bicycle frame thereby preventing rotation of said bolt.

16. A device as claimed in claim 13 wherein said component is a bicycle seat post.

17. A device as claimed in claim 16 wherein said end plate of said bolt further includes a leg extending in the same direction as said threaded portion, said leg being adapted to engage said bicycle frame thereby preventing rotation of said bolt.

* * * * *